United States Patent
Burda et al.

(10) Patent No.: US 8,930,303 B2
(45) Date of Patent: Jan. 6, 2015

(54) DISCOVERING PIVOT TYPE RELATIONSHIPS BETWEEN DATABASE OBJECTS

(75) Inventors: Leon Burda, Cupertino, CA (US); Salil Datta, Cupertino, CA (US); Alexander Gorelik, Palo Alto, CA (US); Dongmei Ren, Sunnyvale, CA (US); Lev M. Tsentsiper, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/435,352

(22) Filed: Mar. 30, 2012

(65) Prior Publication Data

US 2013/0262525 A1 Oct. 3, 2013

(51) Int. Cl.
G06F 7/00 (2006.01)
G06F 17/00 (2006.01)

(52) U.S. Cl.
USPC .......................................... 707/602; 707/603

(58) Field of Classification Search
None
See application file for complete search history.

(56) References Cited

U.S. PATENT DOCUMENTS

| | | | |
|---|---|---|---|
| 5,594,900 A | 1/1997 | Cohn et al. | |
| 5,615,341 A | 3/1997 | Agrawal et al. | |
| 5,675,785 A | 10/1997 | Hall et al. | |
| 5,692,107 A | 11/1997 | Simoudis et al. | |
| 5,794,209 A | 8/1998 | Agrawal et al. | |
| 5,806,066 A | 9/1998 | Golshani et al. | |
| 5,809,297 A | 9/1998 | Kroenke et al. | |
| 5,813,002 A | 9/1998 | Agrawal et al. | |
| 5,943,667 A | 8/1999 | Aggarwal et al. | |
| 5,978,796 A | 11/1999 | Malloy et al. | |
| 6,026,392 A | 2/2000 | Kouchi et al. | |
| 6,049,797 A | 4/2000 | Guha et al. | |
| 6,078,918 A | 6/2000 | Allen et al. | |
| 6,092,064 A | 7/2000 | Aggarwal et al. | |

(Continued)

FOREIGN PATENT DOCUMENTS

| CN | 1435781 A | 8/2003 |
|---|---|---|
| CN | 1145901 C | 4/2004 |

(Continued)

OTHER PUBLICATIONS

Transformation rule discovery through data mining, Kache et al, VLDB'08, Aug. 24-30, 2008.*

(Continued)

Primary Examiner — Augustine K Obisesan
(74) Attorney, Agent, or Firm — David M. Victor; Konrad, Raynes, Davda & Victor LLP (57) ABSTRACT

According to a present invention embodiment, a system determines a relationship between source and target database tables, and includes a computer system including at least one processor. Potential pivot keys of the target database table are determined, and maps are created for each potential pivot key between the database tables based on distinct values. Transformations for each map are generated that enable target data to be produced from source data. The transformations for each potential pivot key are analyzed and the potential pivot key with the transformations that generate the greatest amount of matching data is selected as the resulting pivot key. The database table columns corresponding to the resulting pivot key are determined to be associated by the relationship. Embodiments of the present invention further include a method and computer program product for determining a relationship between source and target database tables in substantially the same manner described above.

20 Claims, 6 Drawing Sheets

(56) References Cited

U.S. PATENT DOCUMENTS

| | | | |
|---|---|---|---|
| 6,112,198 A | 8/2000 | Lohman et al. | |
| 6,182,070 B1 | 1/2001 | Megiddo et al. | |
| 6,185,549 B1 | 2/2001 | Rastogi et al. | |
| 6,226,649 B1 | 5/2001 | Bodamer et al. | |
| 6,272,478 B1 | 8/2001 | Obata et al. | |
| 6,278,997 B1 | 8/2001 | Agrawal et al. | |
| 6,298,342 B1* | 10/2001 | Graefe et al. | 707/602 |
| 6,301,575 B1 | 10/2001 | Chadha et al. | |
| 6,311,173 B1 | 10/2001 | Levin et al. | |
| 6,311,179 B1 | 10/2001 | Agarwal et al. | |
| 6,317,735 B1 | 11/2001 | Morimoto | |
| 6,339,775 B1 | 1/2002 | Zamanian et al. | |
| 6,393,424 B1 | 5/2002 | Hallman et al. | |
| 6,542,881 B1 | 4/2003 | Meidan et al. | |
| 6,594,653 B2 | 7/2003 | Colby et al. | |
| 6,604,095 B1 | 8/2003 | Cesare et al. | |
| 6,609,123 B1 | 8/2003 | Cazemier et al. | |
| 6,836,773 B2 | 12/2004 | Tamayo et al. | |
| 6,850,947 B1 | 2/2005 | Chung et al. | |
| 6,877,012 B2 | 4/2005 | Ashida et al. | |
| 6,941,303 B2 | 9/2005 | Perrizo | |
| 6,954,756 B2 | 10/2005 | Arning et al. | |
| 6,965,888 B1 | 11/2005 | Cesare et al. | |
| 6,973,459 B1 | 12/2005 | Yarmus | |
| 7,007,020 B1 | 2/2006 | Chen et al. | |
| 7,028,288 B2 | 4/2006 | Wall et al. | |
| 7,249,118 B2 | 7/2007 | Sandler et al. | |
| 7,266,537 B2 | 9/2007 | Jacobsen et al. | |
| 7,426,520 B2 | 9/2008 | Gorelik et al. | |
| 7,490,106 B2 | 2/2009 | Dumitru et al. | |
| 7,644,361 B2 | 1/2010 | Wu et al. | |
| 7,680,828 B2 | 3/2010 | Gorelik | |
| 7,702,694 B1* | 4/2010 | Perkins et al. | 707/790 |
| 7,836,004 B2 | 11/2010 | Roth et al. | |
| 8,166,000 B2 | 4/2012 | Labrie et al. | |
| 8,171,001 B2 | 5/2012 | Roth et al. | |
| 2002/0091707 A1 | 7/2002 | Keller | |
| 2002/0178170 A1 | 11/2002 | Britton et al. | |
| 2003/0115280 A1 | 6/2003 | Quine et al. | |
| 2003/0126056 A1* | 7/2003 | Hausman et al. | 705/36 |
| 2003/0158850 A1* | 8/2003 | Lawrence et al. | 707/100 |
| 2003/0191667 A1 | 10/2003 | Fitzgerald et al. | |
| 2003/0212678 A1 | 11/2003 | Bloom et al. | |
| 2003/0217069 A1 | 11/2003 | Fagin et al. | |
| 2004/0015783 A1 | 1/2004 | Lennon et al. | |
| 2004/0093344 A1 | 5/2004 | Berger et al. | |
| 2004/0093559 A1 | 5/2004 | Amaru et al. | |
| 2004/0189708 A1 | 9/2004 | Larcheveque et al. | |
| 2004/0226002 A1 | 11/2004 | Larcheveque et al. | |
| 2005/0055369 A1 | 3/2005 | Gorelik et al. | |
| 2005/0060313 A1 | 3/2005 | Naimat et al. | |
| 2005/0066240 A1 | 3/2005 | Sykes et al. | |
| 2005/0066263 A1 | 3/2005 | Baugher | |
| 2005/0086250 A1* | 4/2005 | Richardson | 707/102 |
| 2005/0108631 A1 | 5/2005 | Amorin et al. | |
| 2005/0144552 A1 | 6/2005 | Kalthoff et al. | |
| 2005/0182739 A1 | 8/2005 | Dasu et al. | |
| 2005/0234688 A1 | 10/2005 | Pinto et al. | |
| 2005/0256892 A1 | 11/2005 | Harken | |
| 2005/0278308 A1* | 12/2005 | Barstow | 707/3 |
| 2006/0004740 A1 | 1/2006 | Dettinger et al. | |
| 2006/0004750 A1* | 1/2006 | Huang et al. | 707/6 |
| 2006/0053382 A1 | 3/2006 | Gardner et al. | |
| 2006/0106847 A1* | 5/2006 | Eckardt et al. | 707/101 |
| 2006/0136461 A1 | 6/2006 | Lee et al. | |
| 2006/0136462 A1 | 6/2006 | Campos et al. | |
| 2006/0161546 A1* | 7/2006 | Callaghan et al. | 707/7 |
| 2006/0167579 A1 | 7/2006 | Fujii et al. | |
| 2006/0253435 A1 | 11/2006 | Nishizawa et al. | |
| 2006/0271528 A1 | 11/2006 | Gorelik | |
| 2006/0274760 A1 | 12/2006 | Loher | |
| 2007/0073688 A1 | 3/2007 | Fry | |
| 2007/0106785 A1 | 5/2007 | Tandon | |
| 2007/0156790 A1* | 7/2007 | Sun Hsu et al. | 707/204 |
| 2007/0179959 A1 | 8/2007 | Sharma et al. | |
| 2007/0239769 A1* | 10/2007 | Fazal et al. | 707/102 |
| 2007/0294221 A1 | 12/2007 | Chen et al. | |
| 2008/0005183 A1* | 1/2008 | Bostick et al. | 707/200 |
| 2008/0027899 A1* | 1/2008 | Khunteta et al. | 707/2 |
| 2008/0085742 A1 | 4/2008 | Karukka et al. | |
| 2008/0243823 A1 | 10/2008 | Baris et al. | |
| 2009/0024551 A1 | 1/2009 | Agrawal et al. | |
| 2009/0094274 A1 | 4/2009 | Gorelik et al. | |
| 2009/0204631 A1* | 8/2009 | Pomroy et al. | 707/102 |
| 2009/0281974 A1* | 11/2009 | Saxena et al. | 706/14 |
| 2009/0327208 A1* | 12/2009 | Bittner et al. | 706/61 |
| 2011/0246503 A1* | 10/2011 | Bender et al. | 707/769 |
| 2012/0078913 A1* | 3/2012 | Muni et al. | 707/740 |
| 2012/0158745 A1 | 6/2012 | Gorelik et al. | |
| 2013/0254183 A1 | 9/2013 | Gorelik et al. | |

FOREIGN PATENT DOCUMENTS

| | | | |
|---|---|---|---|
| WO | WO 0137135 A2 * | 5/2001 | |
| WO | 0175679 A1 | 10/2001 | |
| WO | 02073468 A1 | 9/2002 | |
| WO | 2005027019 | 3/2005 | |

OTHER PUBLICATIONS

Notice of Allowance 2, Apr. 26, 2012, for U.S. Appl. No. 11/779,251, filed Jul. 17, 2007 by G. Agrawal et al., Total 15 pp. [57.141 (NOA2)].

Morgan, Reish, Stone, Swearingen, "Implementation of Comprehensive Qualification and Validation of Entry Fields", TDB.

Notice of Allowance 1, Sep. 20, 2011, for U.S. Appl. No. 11/769,634, filed Jun. 27, 2007 by M.A. Roth et al., Total 19 pp. [57.143 (NOA1)].

Notice of Allowance 1, Sep. 22, 2011, for U.S. Appl. No. 11/769,639, filed Jun. 27, 2007, by J.J. Labrie et al., Total 19 pp. [57.142 (NOA1)].

Notice of Allowance 1, Apr. 19, 2010, for U.S. Appl. No. 11/609,307, filed Dec. 11, 2006 by M.A. Roth et al., Total 11 pp. [57.99 (NOA1)].

Notice of Allowance 2, Jun. 28, 2010, for U.S. Appl. No. 11/609,307, filed Dec. 11, 2006 by M.A. Roth et al., Total 9 pp. [57.99 (NOA2)].

Notice of Allowance 2, Dec. 28, 2011, for U.S. Appl. No. 11/769,634, filed Jun. 27, 2007 by M.A. Roth et al., Total 15 pp. [57.143 (NOA2)].

Office Action 1, Mar. 30, 2011, for U.S. Appl. No. 12/165,549, filed Jun. 30, 2008, by T. Bittner et al., Total 39 pp. [57.170 (OA1)].

Office Action 1, Apr. 6, 2009, for U.S. Appl. No. 11/609,307, filed Dec. 11, 2006 by M.A. Roth et al., Total 26 pp. [57.99 (OA1)].

"Principles of Object Oriented Programming", Total 7 pp.

Saracco, C.M., J. Labrie, and S. Brodsky, [online]. Retrieved from the Internet at <URL: http://www.ibm.com/developerworks/data/library/techarticle/dm-0407saracco/>, "Using Service Data Objects with Enterprise Information Integration Technology", IBM, Jul. 1, 2004, pp. 1-14. [Also Total 14 pp].

Baldwin, R.T., "Views, Objects, and Persistence for Accessing a High Volume Global Data Set", National Climatic Data Center, © 2003, Total 5 pp.

"Procedure Oriented Programming (POP) vs Object Oriented Programming (OOP)", [online], [Retrieved on Oct. 10, 2012]. Retrieved from the Internet at <URL: http://hacksnpasses.blogspot.com/2011/05/procedure-oriented-programmingpop-vs.html>, Thursday, May 26, 2011, Total 8 pp.

Amendment 1, Jan. 11, 2008, for U.S. Appl. No. 10/938,205, filed Sep. 9, 2004 by Gorelik et al., Total 34 pp. [EXE-002 (Amend1)].

Amendment 1, Jul. 6, 2009, for U.S. Appl. No. 11/499,442, filed Aug. 4, 2006 by Gorelik, A., Total 27 pp. [EXE001 (Amend1)].

Amendment 1, Jul. 26, 2011, for U.S. Appl. No. 12/283,477, filed Sep. 12, 2008 by Gorelik et al., Total 21 pp.

Amendment 2, Nov. 9, 2011, for U.S. Appl. No. 12/283,477, filed Sep. 12, 2008 by Gorelik et al., Total 4 pp.

Notice of Allowance, May 1, 2008, for U.S. Appl. No. 10/938,205, filed Sep. 9, 2004 by Gorelik et al., Total 18 pp. [EXE-002 (NOA)].

Notice of Allowance, Aug. 10, 2011, for U.S. Appl. No. 12/283,477, filed Sep. 12, 2008 by Gorelik et al., Total 14 pp.

Office Action 1, Apr. 26, 2011, for U.S. Appl. No. 12/283,477, filed Sep. 12, 2008 by Gorelik et al., Total 24 pp.

International Preliminary Report, Mar. 13, 2006, for PCT/US2004/029631, Total 4 pp.

Written Opinion, Mar. 10, 2006, for PCT/US04/29631, Total 3 pp.

(56) References Cited

OTHER PUBLICATIONS

Preliminary Amendment, Dec. 9, 2009, for U.S. Appl. No. 12/283,477, filed Sep. 12, 2008 by Gorelik et al., Total 8 pp.
Response to Restriction Requirement, Apr. 19, 2011, for U.S. Appl. No. 12/283,477, filed Sep. 12, 2008 by Gorelik et al., Total 1 p.
Restriction Requirement, Jun. 18, 2007, for U.S. Appl. No. 10/938,205, filed Sep. 9, 2004 by Gorelik et al., Total 7 pp. [EXE-002 (RestReq)].
Restriction Requirement, Mar. 23, 2011, for U.S. Appl. No. 12/283,477, filed Sep. 12, 2008 by Gorelik et al., Total 10 pp.
Response to Restriction Requirement, Aug. 17, 2007, for U.S. Appl. No. 10/938,205, filed Sep. 9, 2004 by Gorelik et al., Total 4 pp. [EXE-002 (RspRestReq)].
Restriction Requirement 2, Feb. 13, 2008, for U.S. Appl. No. 10/938,205, filed Sep. 9, 2004 by Gorelik et al., Total 7 pp. [EXE-002 (RestReq2)].
Response to Restriction Requirement 2, Mar. 12, 2008, for U.S. Appl. No. 10/938,205, filed Sep. 9, 2004 by Gorelik et al., Total 4 pp. [EXE-002 (RspRestReq2)].
Notice of Allowance 3, Nov. 9, 2012, for U.S. Appl. No. 11/779,251, filed Jul. 17, 2007 by G. Agrawal et al., Total 24 pp. [57.141 (NOA3)].
Amendment 1, Nov. 29, 2012, for U.S. Appl. No. 13/267,292, filed Oct. 6, 2011 by A. Gorelik et al., Total 6 pp. [57.304D1 (Amend1)].
International Search Report, Mar. 23, 2006, for PCT/US2004/029631, Total 3 pp.
Notice of Allowance 1, Jan. 2, 2013, for U.S. Appl. No. 13/267,292, filed Oct. 6, 2011 by A. Gorelik et al., Total 38 pp. [57.304D1 (NOA1)].
Office Action 3, Jun. 18, 2013, for U.S. Appl. No. 12/165,549, filed Jun. 30, 2008 by T. Bittner et al., Total 37 pp. [57.170 (OA3)].
Amendment 1, Mar. 13, 2014, for U.S. Appl. No. 13/891,130, filed May 9, 2013 by A. Gorelik et al., Total 7 pp. [Amend1 (57.304D2)].
Notice of Appeal, Jan. 28, 2014, for U.S. Appl. No. 12/165,549, filed Jun. 30, 2008 by T. Bittner et al., Total 2 pp. [Notice of Appeal (57.170)].
Pre-Appeal Brief Request for Review, Jan. 28, 2014, for U.S. Appl. No. 12/165,549, filed Jun. 30, 2008 by T. Bittner et al., Total 6 pp. [Pre-Apl Brf Req (57.170)].
Response to Final Office Action 1 for U.S. Appl. No. 12/165,549, dated Dec. 22, 2011, 15 pp. [57.170 (RFOA1)] .
Response to Office Action 3 for U.S. Appl. No. 12/165,549, dated Sep. 18, 2013, 15 pp. [57.170 (ROA3)].
Final Office Action 2 for U.S. Appl. No. 12/165,549, dated Oct. 28, 2013, 46 pp. [57.170 (FOA2)].
Restriction Requirement for U.S. Appl. No. 13/891,130, dated Oct. 16, 2013, 7 pp. [57.304D2 (RestReq)].
Response to Restriction Requirement for U.S. Appl. No. 13/891,130, dated Nov. 18, 2013, 3 pp. [57.304D2 (RespRestReq)].
Office Action 1 for U.S. Appl. No. 13/891,130, dated Dec. 13, 2013, 44 pp. [57.304D2 (OA1)].
Amendment 1, Aug. 6, 2009, for U.S. Appl. No. 11/609,307, filed Dec. 11, 2006 by M.A. Roth et al., Total 16 pp. [57.99 (Amend1)].
Amendment 1, Jul. 7, 2011, for U.S. Appl. No. 11/769,634, filed Jun. 27, 2007 by M.A. Roth et al., Total 17 pp. [57.143 (Amend1)].
Amendment 1, Jul. 14, 2011, for U.S. Appl. No. 11/769,639, filed Jun. 27, 2007 by J.J. Labrie et al., Total 16 pp. [57.142 (Amend1)].
Amendment 1, Jun. 30, 2011, for U.S. Appl. No. 12/165,549, filed Jun. 30, 2008, by T. Bittner et al., Total 19 pp. [57.170 (Amend1)].
Amendment 2, Mar. 10, 2010, for U.S. Appl. No. 11/609,307, filed Dec. 11, 2006 by M.A. Roth et al., Total 11 pp. [57.99 (Amend2)].
Chinese Office Action, Sep. 4, 2009, for Application No. CN2007101867790, 7 pp.
Data Mining Group, "Association Rules" [online], [Retrieved on Nov. 1, 2006]. Retrieved from the Internet at <URL: http://www.dmg.org/v3-1/AssociationRules.html>, 7 pp.
Data Mining Group, "Trees" [online], [Retrieved on Nov. 1, 2006]. Retrieved from the Internet at <URL: http://www.dmg.org/v3-1/TreeModel.html>, 18 pp.
Final Office Action 1, Dec. 10, 2009, for U.S. Appl. No. 11/609,307, filed Dec. 11, 2006 by M.A. Roth et al., Total 10 pp. [57.99 (FOA1)].

Final Office Action 1, Sep. 22, 2011, for U.S. Appl. No. 12/165,549, filed Jun. 30, 2008, by T. Bittner et al.,Total 31 pp. [57.170 (FOA1)].
Han, E.H., G. Karypis, and V. Kumar, "Scalable Parallel Data Mining for Association Rules", 1997 ACM, Proceedings of the 1997 ACM SIGMOD International Conference on Management of Data, pp. 277-288.
Hipp, J., U. Guntzer, & U. Grimmer, "Data Quality Mining—Making a Virtue of Necessity", Proceedings of the 6th ACM SIGMOD Workshop on Research Issues in Data Mining and Knowledge Discovery, 2001, pp. 52-57.
Kache, H., Y. Saillet, and M. Roth, "Transformation Rule Discovery through Data Mining", 2008 ACM, VLDB '08, Aug. 24-30, 2008, VLDB Endowment, Total 4 pp.
Knobbe, A.J., "Multi-Relational Data Mining", Nov. 22, 2004, 130 pp.
Korn, F., A. Labrinidis, Y. Kotidis, & C. Faloutsos, "Quantifiable Data Mining Using Ratio Rules", The VLDB Journal, 2000, pp. 254-266.
Marcus, A., J.I. Maletic, & K. Lin, "Ordinal Association Rules for Error Identification in Data Sets", Proceedings of the Tenth International Conference on Information and Knowledge Management, 2001, pp. 589-591. vol. 38, No. 2, Feb. 1995, pp. 317-318.
Pudi, V., "Data Mining—Association Rules", [online], [retrieved on Nov. 1, 2006], retrieved from the Internet at <URL: http://www.iiit.ac.in/~vikram/mining.html>, 3 pp.
Seekamp, C. and K. Britton, "Dynamic Generation of Rules from Properties to Improve Rule Processing Performance", RD No. 429, Jan. 2000, pp. 172.
Shekhar, S., B. Hamidzadeh, A. Kohli, & M. Coyle, "Learning Transformation Rules for Semantic Query Optimization: A Data-Driven Approach", IEEE Transactions on Knowledge and Data Engineering, vol. 5, Iss. 6, Dec. 1993, pp. 950-964.
Shipway and Tricker, "Data Validation and Correction by Context", TDB Sep. 1971, pp. 1132-1137.
Wikipedia, "Apriori Algorithm", [online], Updated May 22, 2006, [retrieved on Jun. 20, 2008], retrieved from the Internet at <URL: http://en.wikipedia.org/w/index.php?title=apriori_algorithm&printible=yes>, 3 pp.
Wikipedia, "Decision Tree", [online], [retrieved on Nov. 1, 2006], retrieved from the Internet at <URL: http://en.wikipedia.org/w/index.php?title=Decision_tree&printable=yes>, 7 pp.
Wikipedia, "N-gram", [online], [retrieved on May 13, 2007]. Retrieved from the Internet at <URL: http://en.wikipedia.org/wiki/N-gram>, 3 pp.
Williams, J., "Tools for Traveling Data", [online], Jun. 1997, [retrieved on Mar. 25, 2008], retrieved from the Internet at <URL: http://www.dbmsmag.com/9706d16.html>, 10 pp.
Notice of Allowance 1, Aug. 29, 2011, for U.S. Appl. No. 11/779,251, filed Jul. 17, 2007 by G. Agrawal et al., Total 18 pp. [57.141 (NOA1)].
Office Action 1, Apr. 5, 2010, for U.S. Appl. No. 11/779,251, filed Jul. 17, 2007 by G. Agrawal et al., Total 29 pp. [57.141 (OA1)].
Final Office Action 1, Oct. 1, 2010, for U.S. Appl. No. 11/779,251, filed Jul. 17, 2007 by G. Agrawal et al., Total 23 pp. [57.141 (FOA1)].
Amendment 1, Jul. 6, 2010, for U.S. Appl. No. 11/779,251, filed Jul. 17, 2007 by G. Agrawal et al., Total 16 pp. [57.141 (Amend1)].
Amendment 2, Dec. 28, 2010, for U.S. Appl. No. 11/779,251, filed Jul. 17, 2007 by G. Agrawal et al., Total 18 pp. [57.141 (Amend2)].
Office Action 1, Apr. 14, 2011, for U.S. Appl. No. 11/769,639, filed on Jun. 27, 2007 by J.J. Labrie et al., Total 36 pp. [57.142 (OA1)].
English Abstract for CN1435781A, published Aug. 13, 2003, Total 1 p.
English Abstract for CN1145901C, published Apr. 14, 2004, Total 1 p.
Nesvizhskii, A.I., F.F. Roos, J. Grossmann, M. Vogelzang, J.S. Eddes, W. Gruissem, S. Baginsky, and R. Aebersold, "Dynamic Spectrum Quality Assessment and Iterative Computational Analysis of Shotgun Proteomic Data", Molecular & Cellular Proteomics, vol. 5, © 2006, The American Society for Biochemistry and Molecular Biology, Inc., pp. 652-670.
Janta-Polczynski, M. and E. Roventa, "Fuzzy Measures for Data Quality", 18th International Conference of the North American Fuzzy Information Processing Society, Jul. 1999, pp. 398-402.
Marchetti, C., M. Mecella, M. Scannapieco, and A. Virgillito, "Enabling Data Quality Notification in Cooperative Information Sys- (56) References Cited

OTHER PUBLICATIONS tems through a Web-Service Based Architecture", Proceedings of the Fourth International Conference on Web Information Systems Engineering, 2003, Total 4 pp.
Wang, R.Y., H.B. Kon, and S.E. Madnick, "Data Quality Requirements Analysis and Modeling", Proceedings of the Ninth International Conference on Data Engineering, 1999, pp. 670-677.
Chinese Office Action, Sep. 4, 2009, for Application No. CN2007101867790, Total 7 pp.
Jingyi, D., "Survey of Association Rule Data Mining", © 1994-2009 China Academic Journal Electronic Publishing House, Total 2 pp. [with English Abstract on p. 1].
Peim, M., E. Franconi, and N.W. Paton, "Estimating the Quality of Answers when Querying over Description Logic Ontologies", Data & Knowledge Engineering, © 2003, Total 25 pp.
Notice of Allowance, Oct. 27, 2009, for U.S. Appl. No. 11/499,442, filed Aug. 4, 2006 by A. Gorelik et al., Total 27 pp.
Office Action 1, Sep. 11, 2007, for U.S. Appl. No. 10/938,205, filed Sep. 9, 2004 by A. Gorelik et al., Total 19 pp. [250214-1020 (OA1)].
Office Action 1, Aug. 29, 2012, for U.S. Appl. No. 13/267,292, filed Oct. 6, 2011 by A. Gorelik et al., Total 23 pp. [57.304D1 (OA1)].
Office Action 1, Mar. 5, 2009, for U.S. Appl. No. 11/499,442, filed Aug. 4, 2006 by A. Gorelik et al., Total 22 pp. [EXE001 (OA1)].
Preliminary Amendment, Oct. 6, 2011, for U.S. Appl. No. 13/267,292, filed Oct. 6, 2011 by A. Gorelik et al., Total 8 pp. [57.304D1 (PrelimAmend)].
Restriction Requirement, Jul. 9, 2012, for U.S. Appl. No. 13/267,292, filed Oct. 6, 2011 by A. Gorelik et al., Total 8 pp. [57.304D1 (RstReq)].
Response to Restriction Requirement, Aug. 9, 2012, for U.S. Appl. No. 13/267,292, filed Oct. 6, 2011 by A. Gorelik et al., Total 1 p. [57.304D1 (RspRstReq)].
Informatica, The Data Integration Company, "Enterprise Data Integration—Maximizing the Business Value of your Enterprise Data", Feb. 24, 2006, Total 9 pp.
Appeal Brief, Apr. 28, 2014, for U.S. Appl. No. 12/165,549, filed Jun. 30, 2008 by T. Bittner et al., Total 30 pp. [57.170 (AplBrf)].
Notice of Allowance, Jun. 18, 2014 for U.S. Appl. No. 13/891,130, filed May 9, 2013 by A. Gorelik et al., Total 12 pp. [57.304D2 (NOA)].
Examiners Answer, Jun. 5, 2014, for U.S. Appl. No. 12/165,549, filed Jun. 30, 2008 by T. Bittner et al., Total 37 pp. [Exmr'sAnswer (57.170)].
Morgan, Reish, Stone, Swearingen, "Implementation of Comprehensive Qualification and Validation of Entry Fields", TDB, 38(2), pp. 317-318, 1995.
Muller, H., U. Leser, & J. Freytag, "Mining for Patterns in Contradictory Data", Proceedings of the 2004 International Workshop on Information Quality in Information Systems, 2004, pp. 51-58.
Notice of Allowance 1, Sep. 20, 2011, for U.S. Appl. No. 11/769,634, filed on Jun. 27, 2007 by M.A. Roth et al., Total 19 pp. [57.143 (NOA1)].
Notice of Allowance 1, Sep. 22, 2011, for U.S. Appl. No. 11/769,639, filed on Jun. 27, 2007, by J.J. Labrie et al., Total 19 pp. [57.142 (NOA1)].
Notice of Allowance 1, Apr. 19, 2010, for U.S. Appl. No. 11/609,307, filed on Dec. 11, 2006 by M.A. Roth et al., Total 11 pp. [57.99 (NOA1)].
Notice of Allowance 2, Jun. 28, 2010, for U.S. Appl. No. 11/609,307, filed on Dec. 11, 2006 by M.A. Roth et al., Total 9 pp. [57.99 (NOA2)].
Notice of Allowance 2, Dec. 14, 2011, for U.S. Appl. No. 11/769,639, filed on Jun. 27, 2007 by J.J. Labrie et al., Total 15 pp. [57.142 (NOA2)].
Notice of Allowance 2, Dec. 28, 2011, for U.S. Appl. No. 11/769,634, filed on Jun. 27, 2007 by M.A. Roth et al., Total 15 pp. [57.143 (NOA2)].
Office Action 1, Apr. 7, 2011, for U.S. Appl. No. 11/769,634, filed on Jun. 27, 2007 by M.A. Roth et al., Total 40 pp. [57.143 (OA1)].
Office Action 1, Mar. 30, 2011, for U.S. Appl. No. 12/165,549, filed on Jun. 30, 2008, by T. Bittner et al., Total 39 pp. [57.170 (OA1)].
Office Action 1, Apr. 6, 2009, for U.S. Appl. No. 11/609,307, filed on Dec. 11, 2006 by M.A. Roth et al., Total 26 pp. [57.99 (OA1)].

\* cited by examiner

DISCOVERING PIVOT TYPE RELATIONSHIPS BETWEEN DATABASE OBJECTS

BACKGROUND

1. Technical Field

Present invention embodiments relate to determining relationships between database objects, and more specifically, to determining pivot type (e.g., reverse pivot, pivot, etc.) relationships between database objects.

2. Discussion of the Related Art

Pivoting or reverse pivoting of database tables is a technology in data mining and data warehousing intended to increase efficiency of data warehousing, data mining, and other data analysis. Data is pivoted or reverse pivoted between source and target data sets. For example, data of a target database table column (e.g., indicating a particular quarter of a year, etc.) may serve as columns for the source database table (e.g., for data pertaining to that quarter).

Discovery of relationships between source and target data sets is an initial stage of information technology projects. This discovery may be automated, where relationships between source and target data are analyzed to determine mappings designating the manner in which the target data is generated from the source data. The mappings include binding conditions and transformations. The binding conditions pertain to the conditions (expressed as SQL) that relate portions of the source database table to corresponding portions of the target database table. The transformations include expressions (SQL) for each target database table column that comprise source database table columns, constants, and valid SQL expressions. The transformation expressions define the manner in which target database table column data is generated from source database table columns related by a binding condition. However, the binding conditions and transformations are not sufficient to analyze reverse pivot relationships since the target data cannot be re-constructed with a single mapping.

BRIEF SUMMARY

According to one embodiment of the present invention, a system determines a relationship between source and target database tables, and includes a computer system including at least one processor. The system determines one or more potential pivot keys of the target database table. A potential pivot key includes one or more columns of the target database table with data indicating identifiers of a plurality of source database table columns. Maps are created for each potential pivot key between rows of the source and target database tables based on distinct values of that potential pivot key. One or more transformations for each map are generated that enable data for the target database table to be produced from the corresponding data in the source database table. The system analyzes the one or more transformations for each potential pivot key and selects the potential pivot key with the one or more transformations that generate the greatest amount of data matching data in the target database table as the resulting pivot key. The source and target database table columns corresponding to the resulting pivot key are determined as being associated by the relationship. Embodiments of the present invention further include a method and computer program product for determining a relationship between source and target database tables in substantially the same manner described above.

DETAILED DESCRIPTION

Present invention embodiments pertain to determining pivot type (e.g., reverse pivot and pivot) relationships between database objects. Present invention embodiments discover reverse pivot and pivot relationships automatically by mining over both data and metadata. Pivot keys (including columns of a target database table) are discovered and presented as data in pivoted data sets (of the target database table) and as metadata (e.g., column labels, etc.) in the reverse pivot data sets (of a source database table). This is a powerful way to bridge data and metadata, and provides a much more powerful ability to discover pivot transformations. Further, one-to-one map relationships are discovered that can be used to construct new data sets with an optimal structure. Both single column pivot keys and composite pivot keys (e.g., pivot keys comprising plural target database table columns, such as columns referencing quarter and month within a quarter) are discovered very efficiently in batch with enhanced accuracy.

An embodiment of the present invention discovers reverse pivot relationships between source and target database tables. In other words, a present invention embodiment performs automated discovery of plural mappings that enables the building/analyzing of reverse pivot relationships within source and target data. The relationship determination initially discovers pivot key columns (e.g., columns of the target database table with data values that are related to the metadata (e.g., column names, etc.) of the source database table). The data of the target database table rows are repeatedly analyzed to determine a correspondence with a single row of the source database table associated by a binding condition. Potential pivot keys may be selected based on a cardinality of a combination of distinct values. For example, the target database table columns forming a pivot key include low cardinality values (e.g., MONTH, QUARTER, etc.), and are mapped to the source database table metadata (e.g., target database table column data 'Q1' is mapped to source database table columns Q1SALES, Q1RETURNS; target database table column data 'Q2' is mapped to source database table columns Q2SALES, Q2RETURNS, etc.).

Mappings (e.g., including binding conditions and transformations) are created for each potential pivot key. If an acceptable mapping exists for non-binding condition columns (e.g., columns without a corresponding binding condition), the corresponding source and target database table columns are good candidates for a reverse pivot relationship. In the event plural reverse pivot relationship candidates are discovered, the best candidate (e.g., pivot and pivoted columns) are selected based on statistics gathered during creation of the mappings.

Figure 1:
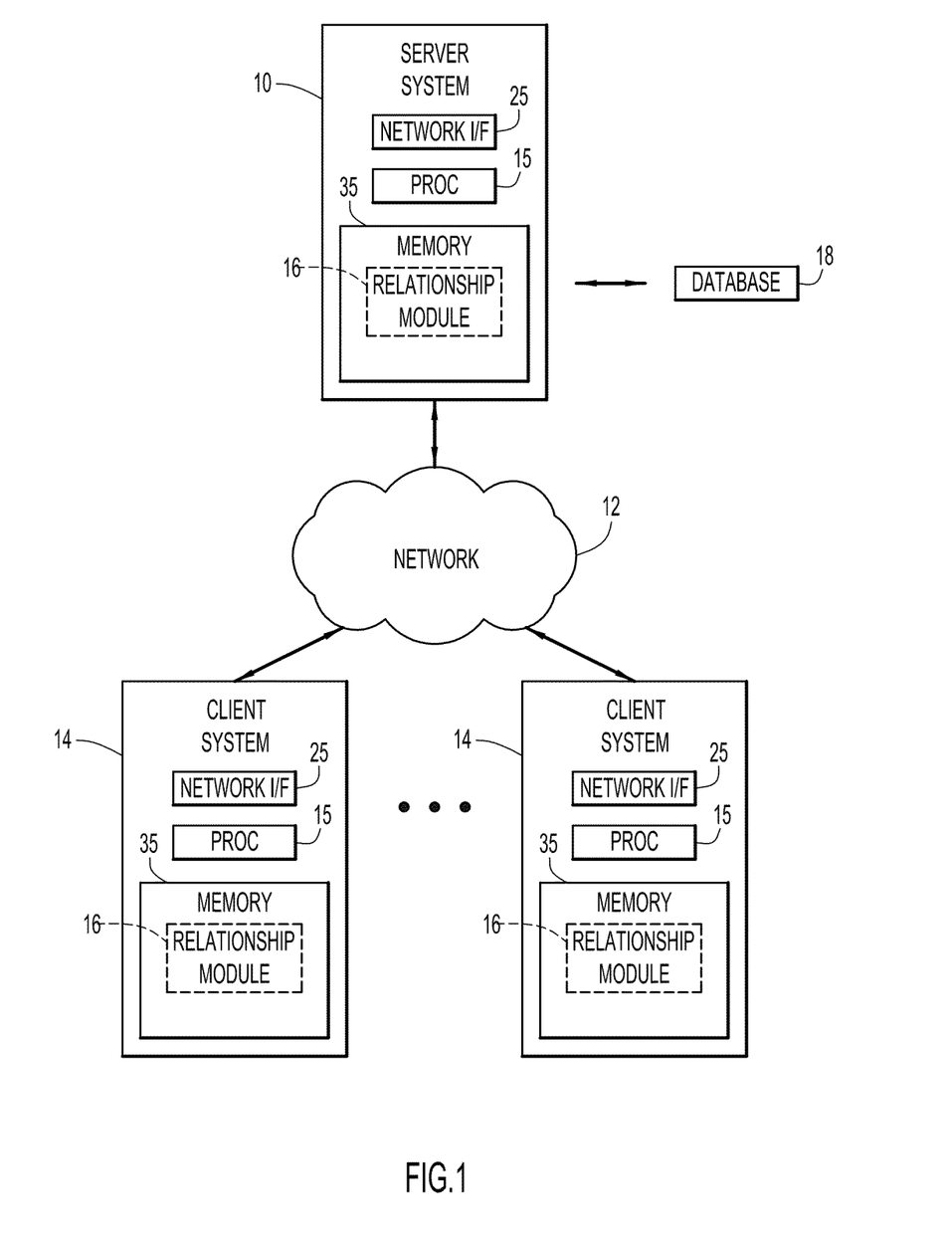
FIG. 1 is a diagrammatic illustration of an example computing environment for use with an embodiment of the present invention.

An example environment for use with present invention embodiments is illustrated in FIG. 1. Specifically, the environment includes one or more server systems 10, and one or more client systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Client systems 14 perform the discovery of pivot type relationships between database objects, while server systems 10 provide information (e.g., metadata, database table data, mappings, transformations, binding conditions, etc.) to the client systems for the relationship discovery. In other words, the relationship discovery is preferably implemented as a client application, where one or more client systems 14 may perform the relationship discovery on respective sets of database tables.

Client system 14 includes a relationship module 16 to discover the pivot type relationships. A database system 18 may store various information for the relationship discovery (e.g., metadata, database table data, mappings, transformations, binding conditions, etc.). The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). Client system 14 may present a graphical user (e.g., GUI, etc.) or other interface (e.g., command line prompts, menu screens, etc.) (e.g., FIGS. 4-6) to provide and/or solicit information from users pertaining to the relationship discovery (e.g., desired database objects, parameter values, results, etc.), and may further provide reports including results (e.g., discovered relationships, database table columns, etc.).

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and/or custom software (e.g., server/communications software, relationship module, browser/interface software, etc.).

Alternatively, one or more server systems 10 may perform the relationship discovery, and provide results to the client systems. In other words, the relationship discovery may be implemented as a server application. In this case, server system 10 stores or has access to the data (e.g., metadata, database table data, mappings, transformations, binding conditions, etc.), and includes relationship module 16. The graphical user (e.g., GUI, etc.) or other interface (e.g., command line prompts, menu screens, etc.) of the client system (e.g., FIGS. 4-6) provides and/or solicits information from a corresponding user pertaining to the relationship discovery (e.g., desired database objects, parameter values, results, etc.) for transference to the server system, and may further provide reports including results received from the server system (e.g., discovered relationships, database table columns, etc.). By way of example only, modules of the server systems for performing the relationship discovery may be implemented in Java 6, while modules for the client systems may be implemented in C#. However, any suitable programming languages may be utilized.

Relationship module 16 may include one or more modules or units to perform the various functions of present invention embodiments described below. The various modules (e.g., relationship module, etc.) may be implemented by any combination of any quantity of software and/or hardware modules or units, and may reside within memory 35 of the server and/or client systems for execution by processor 15.

Figure 2:
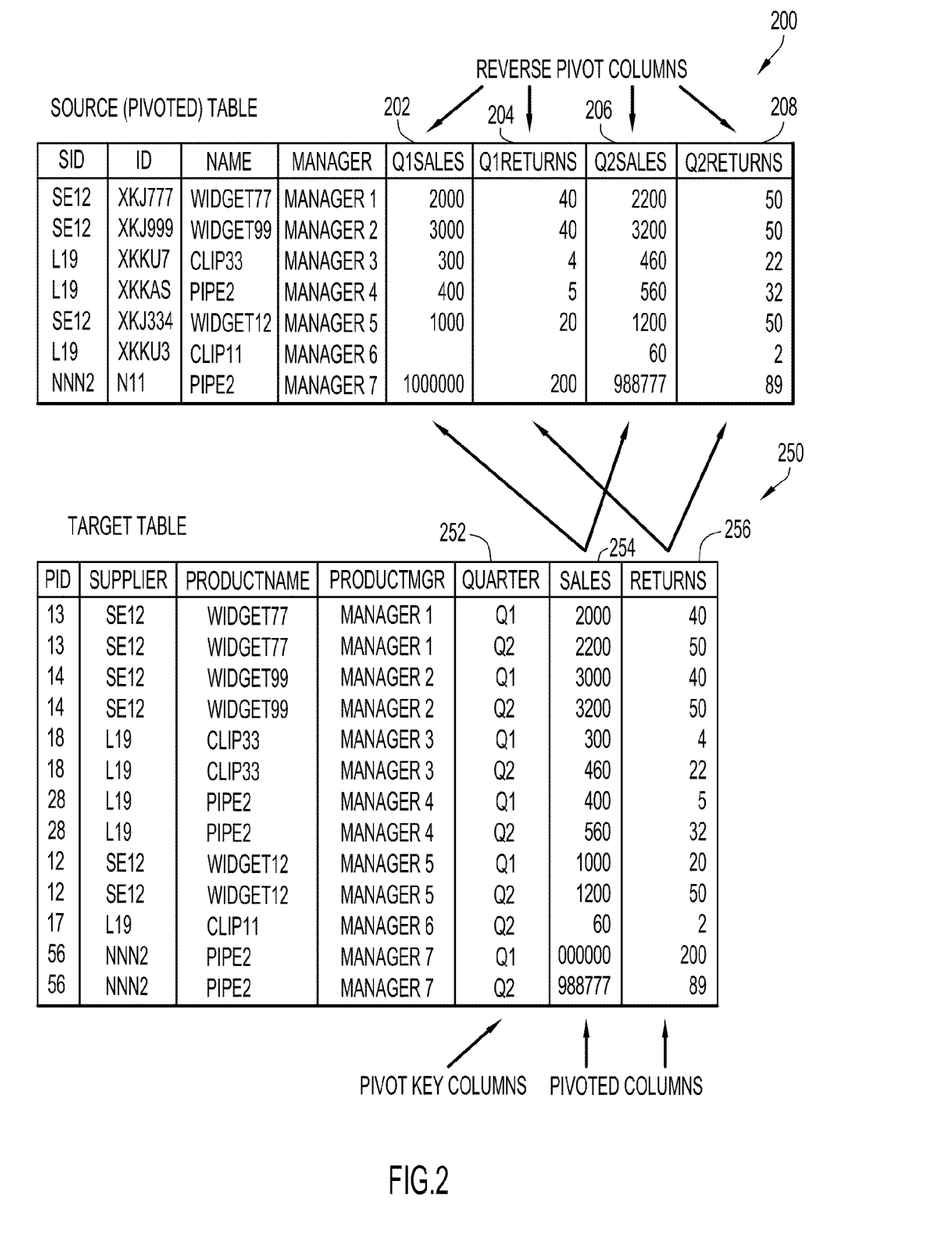
FIG. 2 is a diagrammatic illustration specifying pivot type relationships between example source and target database tables.

Present invention embodiments discover pivot type (e.g., reverse pivot and pivot) relationships between database tables. The database tables are referred to herein as "source" and "target" database tables for purposes of describing present invention embodiments. However, pivot type relationships may be determined for any database tables labeled in any fashion. An example of pivot type (e.g., reverse pivot and pivot) relationships between source and target database tables is illustrated in FIG. 2. Specifically, a source target database table 200 includes rows with various columns (e.g., SID, ID, NAME, MANAGER, Q1SALES 202, Q2RETURNS 204, Q2SALES 206, and Q2RETURNS 208) for storing data. Similarly, a target database table 250 includes rows with various columns (e.g., PID, SUPPLIER, PRODUCTNAME, PRODUCTMGR, QUARTER 252, SALES 254, and RETURNS 256) for storing data. Columns 202, 204, 206, and 208 of source database table 250 are reverse pivot columns (or have a reverse pivot relationship) with pivoted columns 254 and 256 of target database table 250. In other words, data within the pivoted columns of the target database table for a plurality of rows appears within a single row of the source database table (e.g., a one-to-many relationship between the source database table row and target database table rows). Column 252 is a pivot key column since the data of this column (e.g., Q1, Q2) pertains to metadata (or labels) of the reverse pivot columns (e.g., Q1SALES 202, Q1RETURNS 204, Q2SALES 206, and Q2RETURNS 208) of source database table 200.

A present invention embodiment performs relationship discovery to identify reverse pivot relationships between source and target database tables. The results of the relationship discovery include pivot key columns of the target database table, pivoted columns of the target database table, the reverse pivot columns of the source database table, and plural mappings to re-create target data from source data or to analyze reverse pivot relationships between source and target database tables (where one mapping exists for each distinct set of values of the pivot key columns).

Figure 3:
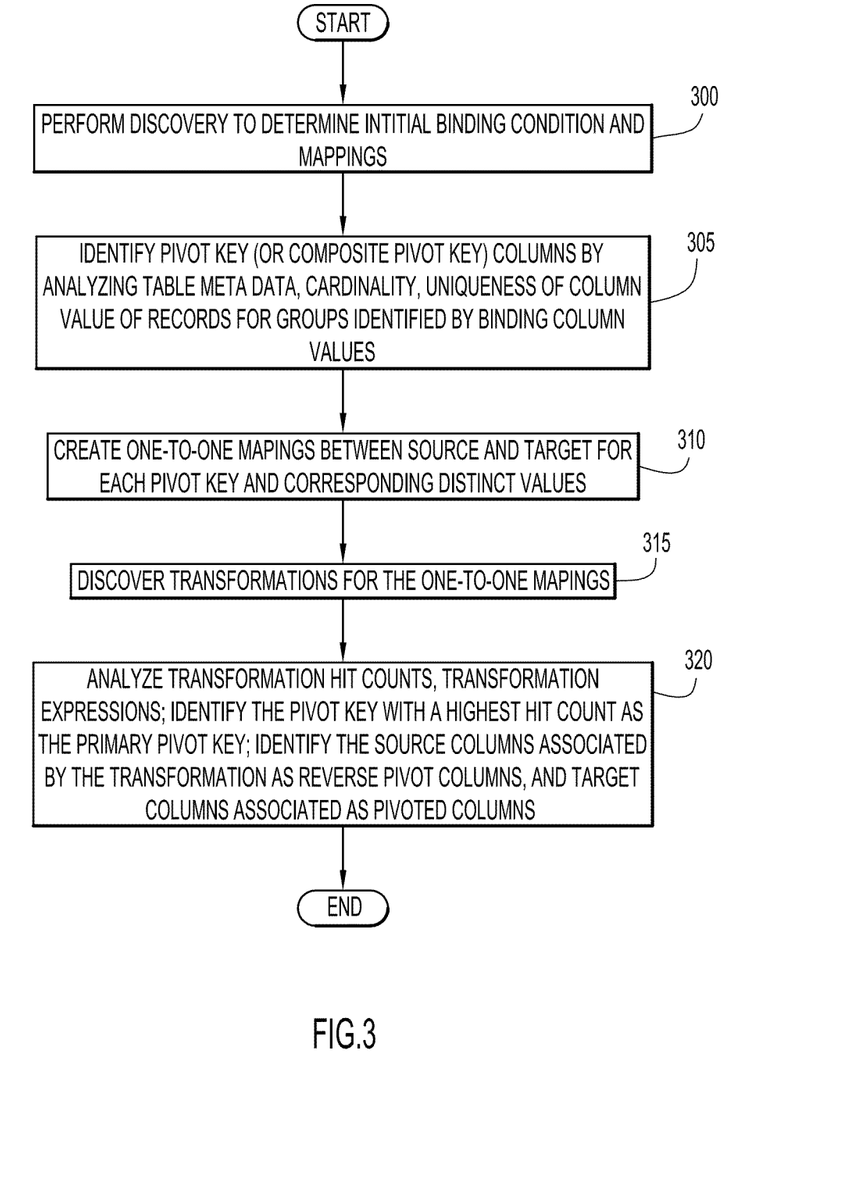
FIG. 3 is a procedural flowchart illustrating a manner of determining a reverse pivot relationship between source and target database tables according to an embodiment of the present invention.

A manner of discovering reverse pivot relationships (e.g., via relationship module 16 and server system 10 and/or client system 14) between a source database table and a target database table according to an embodiment of the present invention is illustrated in FIG. 3. The relationship discovery includes pivot key discovery, one-to-one map discovery, transformation discovery, and identification of reverse pivot columns and pivot columns of the source and target database tables. By way of example, the relationship discovery is described with respect to source and target database tables, where a binding condition including source and target database table columns exists and provides a one-to-many association between source and target database table rows.

A mapping discovery is performed on the source and target database tables at step 300 to determine initial binding conditions and transformations defining mappings between the source and target data. The binding conditions indicate the constraints (e.g., expressed in SQL) that relate data in the source database table to data in the target database table. In other words, a binding condition is a Boolean expression between the columns of the source database table and the columns of the target database table that exclusively matches a row or a set of rows in the source database table with a row or a set of rows in the target database table. For example, a binding condition S.customerid=T.clientnum matches a row that represents a company, XYZ, as a customer in a source database table, S, with a corresponding row that represents company XYZ as a customer in target database table, T. The transformations include expressions (e.g., expressed in SQL) for each target database table column that define the manner of generating target database table columns from source database table columns related by the corresponding binding condition. Thus, the binding condition associates rows of the source and target database tables, while the transformations enable generation of the target database column data from the source database column data of rows associated by the binding condition.

This initial mapping discovery may be performed by providing known binding conditions and/or transformations between the source and target database tables. Alternatively, various conventional automated mapping discovery techniques may be employed. For example, automated mapping discovery may be accomplished by the techniques disclosed in U.S. Pat. No. 7,426,520 (Gorelik et al.), the disclosure of which is incorporated herein by reference in its entirety. These techniques perform binding condition discovery, correlation discovery, and transformation discovery to identify mappings between data. Metadata and data in the source and target database tables may be analyzed using a set of rules, techniques, and statistics to deduce relationships. The schema in the disparate database tables is converted into a normalized relational model. Normalized schemas are converted into data objects with a key and scalar and non-scalar attributes. Metadata and data analysis is used for binding condition discovery to discover a binding condition that relates the data object instances across the database tables.

The object instances related through the binding condition are analyzed for correlation discovery to establish attribute correlation. A set of source database table columns are correlated to a set of target database columns, if in every row of a source database table, the value of the source database table column always corresponds to the same value of the target database table column in a bound row of the target database table. For example, Source.Region is correlated to Target.District, if for every row of the Source database table where Region='R1', the bound row of the Target database table includes District="East".

In addition, transformation discovery is applied to correlated attributes (columns) to discover transformation functions. The transformation functions generate the target database table column values from the source database table column values based on a binding condition and correlation between one or more source database table columns and a target database table column. For example, if Target.AreaCode=substring(Source.Phone, 1, 3) (first three characters of the Source.Phone field), there is a correlation between Target.AreaCode and Source.Phone and the transformation function is substring (Source.Phone, 1, 3).

Once the initial mapping discovery is performed to generate the binding conditions and transformations, a pivot key (e.g., a single column or composite pivot key) is identified at step 305. The pivot key includes one or columns from the target database table with data related to metadata (or labels) of the source database table columns. In particular, metadata and data from the respective source and target database tables that have a one-to-many association are retrieved for analysis. For example, a row of the source database table may have data from one or more columns of a plurality of rows within the target database table. Since the one-to-many association is a characteristic of a reverse pivot relationship as discussed above (FIG. 2), the source and target database table rows with this type of association are retrieved for further analysis.

The retrieval may be accomplished by initially examining the cardinality (e.g., a measure of unique values) of the target database table columns. If the cardinality of a target database table column is greater than two, but less than the number of columns of the source database table without corresponding initial binding conditions, the target database table column is added to a candidate list. However, binding condition columns, columns that are closely correlated with binding condition columns and that have the same cardinality, and columns with constant values are filtered from (or prevented from being placed on) the candidate list. These filtering criteria may vary and be optimized for different domains.

A SQL statement is generated to retrieve rows from the source and target database tables that satisfy a one-to-many binding condition. An example statement includes the following.

```
SELECT binding condition columns, potential pivot key columns
FROM SOURCE, TARGET
WHERE binding condition
ORDER BY binding condition columns
```

The retrieved data are grouped based on the value of an identity column. The identity column is preferably a composite value of the data from the binding condition columns. Each group includes records that correspond to one value of the identity column. In the event of plural tables from a source, the columns from the plural tables can be combined for a group.

Each candidate pivot key column (from the candidate list) is examined for unique values within each group. The uniqueness may be maintained by a counter. For example, the counter is incremented for each group including unique values for the examined pivot key column, and utilized to determine a selectivity ratio (e.g., count of groups with unique values/number of groups) for that candidate pivot key column. When the selectivity ratio for a candidate pivot key column is greater than a threshold (e.g., 0.8 by default), the candidate pivot key column is identified as a potential pivot key. In the event that different potential pivot keys are identified and produce identical statistics, name matching and/or fuzzy matching on a metadata level (e.g., candidate pivot key column values that match or fuzzy match source database table column names) may be utilized to select a potential pivot key. The size of the column set may further be utilized for this potential pivot key selection.

If the selectivity ratio for a candidate pivot key column is less than the threshold, another pivot key candidate column (from the candidate list) is combined with the current candidate pivot key column for consideration, where composite values from the combined columns are examined to determine the uniqueness of values and selectivity ratio in substantially the same manner described above to identify a potential composite pivot key. This process is repeated until a potential pivot key (e.g., potential composite pivot key (e.g., including plural candidate pivot key columns)) is identified, or until a maximum number of combined columns (e.g., a default value of two) is attained. The maximum number of columns may be configured by a user.

Once one or more potential pivot keys (e.g., single column or composite pivot keys) are determined, one-to-one maps are created between source and target database tables for each potential pivot key at step 310. In particular, for each pivot key column of a potential pivot key and corresponding distinct value in a unique value set for that pivot key column, a modified binding condition is determined to form a one-to-one map. The modified binding condition is of the following form.

Initial Binding Condition AND PKFilter, where PKFilter represents a series of equalities indicating each column of the potential pivot key and the corresponding unique value. For example, with respect to the source and target database tables of FIG. 2: a one-to many binding condition may include (SOURCE.NAME=TARGET.PRODUCTNAME) AND (SOURCE.SID=TARGET.SUPPLIER); the column of the discovered potential pivot key may be QUARTER column 252; and the set of unique values for this column include Q1 and Q2. The modified binding condition (Initial Binding Condition AND PKFilter) for this example becomes,

---

(SOURCE.NAME = TARGET.PRODUCTNAME) AND (SOURCE.SID = TARGET.SUPPLIER) AND TARGET.QUARTER = 'Q1' OR
  (SOURCE.NAME = TARGET.PRODUCTNAME) AND (SOURCE.SID = TARGET.SUPPLIER) AND TARGET.QUARTER = 'Q2'.

---

Thus, plural one-to-one maps are generated based on the unique values of the columns of the potential pivot key.

Once the one-to-one maps are created, correlations and transformations for these maps are determined at step 315. Transformation discovery determines transformation functions between a plurality of columns of the source database table and a plurality of columns of the target database table. Correlation and transformation discovery are performed for each one-to-one map to find primary transformations for each target database table column (e.g., excluding binding condition and potential pivot key columns). The transformations basically provide a manner of generating target database table column data from corresponding columns of the source database table as described above. The correlation and transformation discovery may be performed by any conventional techniques, such as the techniques described above.

The determined transformations for each one-to-one map of a potential pivot key are analyzed at step 320 to determine a pivot key (from the target database table), the reverse pivot columns of the source database table, and the pivoted columns of the target database table. In particular, for each one-to-one map associated with a potential pivot key, a count of correctly transformed (or hit) rows produced by the transformations is maintained, where a total count is determined for each potential pivot key. The potential pivot key associated with the greatest total count for corresponding transformations is selected as the pivot key. Columns of the source and target database tables that are associated with transformations having high hit counts are identified for a reverse pivot relationship, where source database table columns in the relationship are identified as reverse pivot columns, and the corresponding target database table columns in the relationship are identified as the pivoted columns.

The same or similar process may be used to discover a pivot relation between source and target database tables. In this case, the initial binding condition for the original mapping should have a many-to-one association between source and target database table rows. The source and target database tables are switched (e.g., the target database table is used as the source and the source database table is used as the target) to provide a one-to-many association, where the pivot keys may be discovered in substantially the same manner described above. Once the pivot keys are determined, there may be pivot with and without aggregation.

With respect to a pivot without aggregation, the intermediate maps have a one-to-one relationship, and discovery for the correlations and transformations of the one-to-one maps between the source and target is performed in substantially the same manner described above. This discovery may employ various conventional techniques, such as the technique described above. The transformations are utilized to identify the pivot relationship based on hit counts in substantially the same manner described above.

In the case of a pivot with aggregation, the intermediate maps have many-to-one relationship, and aggregation mapping discovery to identify corresponding correlations and transformations is performed between the source and target. This discovery may be accomplished by various conventional techniques. The transformations are utilized to identify the pivot relationship based on hit counts in substantially the same manner described above.

An example of determining reverse pivot relationships is described with reference to the following example source and target database tables.

| | | \multicolumn{6}{c}{Source (pivoted) Table} |
|---|---|---|---|---|---|---|---|
| SID | NAME | Q1M1 SALES | Q1M2 SALES | Q1M3 SALES | Q2M1 SALES | Q2M2 SALES | Q2M3 SALES |
| SE12 | Widget77 | 500 | 1000 | 500 | 1000 | 600 | 600 |
| SE12 | Widget99 | 1000 | 1000 | 1000 | 1000 | 1000 | 1200 |
| L19 | Cip33 | 100 | 150 | 50 | 100 | 200 | 160 |
| L19 | Pipe2 | 50 | 200 | 150 | 200 | 150 | 210 |
| SE12 | Widget12 | 100 | 300 | 600 | 600 | 300 | 300 |

TARGET TABLE

| SUPPLIER | PRODUCT NAME | QUARTER | MONTH | QUARTER_QUALITY | SALES |
|---|---|---|---|---|---|
| SE12 | Widget77 | Q1 | 1 | 1 | 500 |
| SE12 | Widget77 | Q1 | 2 | 2 | 1000 |
| SE12 | Widget77 | Q1 | 3 | 3 | 500 |
| SE12 | Widget77 | Q2 | 1 | 4 | 1000 |
| SE12 | Widget77 | Q2 | 2 | 5 | 600 |
| SE12 | Widget77 | Q2 | 3 | 1 | 600 |
| SE12 | Widget99 | Q1 | 1 | 2 | 1000 |
| SE12 | Widget99 | Q1 | 2 | 3 | 1000 |
| SE12 | Widget99 | Q1 | 3 | 4 | 1000 |
| SE12 | Widget99 | Q2 | 1 | 5 | 1000 |
| SE12 | Widget99 | Q2 | 2 | 1 | 1000 |
| SE12 | Widget99 | Q2 | 3 | 2 | 1200 |
| L19 | Cip33 | Q1 | 1 | 3 | 100 |
| L19 | Cip33 | Q1 | 2 | 4 | 150 |
| L19 | Cip33 | Q1 | 3 | 5 | 50 |
| L19 | Cip33 | Q2 | 1 | 1 | 100 |
| L19 | Cip33 | Q2 | 2 | 2 | 200 |
| L19 | Cip33 | Q2 | 3 | 3 | 160 |
| L19 | Pipe2 | Q1 | 1 | 4 | 50 |
| L19 | Pipe2 | Q1 | 2 | 5 | 200 |
| L19 | Pipe2 | Q1 | 3 | 1 | 150 |
| L19 | Pipe2 | Q2 | 1 | 2 | 200 |
| L19 | Pipe2 | Q2 | 2 | 3 | 150 |
| L19 | Pipe2 | Q2 | 3 | 4 | 210 |
| SE12 | Widget12 | Q1 | 1 | 5 | 100 |
| SE12 | Widget12 | Q1 | 2 | 1 | 300 |
| SE12 | Widget12 | Q1 | 3 | 2 | 600 |
| SE12 | Widget12 | Q2 | 1 | 3 | 600 |
| SE12 | Widget12 | Q2 | 2 | 4 | 300 |
| SE12 | Widget12 | Q2 | 3 | 5 | 300 |

A query is created to retrieve data that is based on a binding condition discovered during an initial discovery. The binding condition may be expressed as the following,

```
(SOURCE.NAME = TARGET.PRODUCTNAME) AND
(SOURCE.SID = TARGET.SUPPLIER),
``` where the query expression may include the following,

```
SELECT SOURCE.NAME, SOURCE.SID, QUARTER, MONTH,
QUARTER_QUALITY FROM SOURCE,TARGET
WHERE (SOURCE.NAME = TARGET.PRODUCTNAME)
AND (SOURCE.SID = TARGET.SUPPLIER)
ORDERBY SOURCE.NAME, SOURCE.SID
```

The retrieved data is formed into groups based on the binding condition (BC) column values, and may include the following.

| IDENTITY <--> BC Values Vx | QUARTER | MONTH | QUARTER_QUALITY |
|---|---|---|---|
| V1 (Vx denotes a composite value of binding condition columns) Group 1 | Q1 | 1 | 1 |
| | Q1 | 2 | 2 |
| | Q1 | 3 | 3 |
| | Q2 | 1 | 4 |
| | Q2 | 2 | 5 |
| | Q2 | 3 | 1 |
| V2 Group 2 | Q1 | 1 | 2 |
| | Q1 | 2 | 3 |
| | Q1 | 3 | 4 |
| | Q2 | 1 | 5 |
| | Q2 | 2 | 1 |
| | Q2 | 3 | 2 |
| V3 Group 3 | Q1 | 1 | 3 |
| | Q1 | 2 | 4 |
| | Q1 | 3 | 5 |
| | Q2 | 1 | 1 |
| | Q2 | 2 | 2 |
| | Q2 | 3 | 3 |
| V4 Group 4 | Q1 | 1 | 4 |
| | Q1 | 2 | 5 |
| | Q1 | 3 | 1 |
| | Q2 | 1 | 2 |
| | Q2 | 2 | 3 |
| | Q2 | 3 | 4 |
| V5 Group 5 | Q1 | 1 | 5 |
| | Q1 | 2 | 1 |
| | Q1 | 3 | 2 |
| | Q2 | 1 | 3 |
| | Q2 | 2 | 4 |
| | Q2 | 3 | 5 |

The data is retrieved from memory on a chunk basis. For each chunk of data, hash sets may be employed to determine the uniqueness. In this example, the uniqueness of the values of the column QUARTER in Groups 1-5 is determined. A counter (e.g., UNIQUE_COUNTER) is incremented (e.g., by 1) for each group having unique values. When all groups are processed, a selectivity is determined (e.g., UNIQUE_COUNTER/number of groups). With respect to the column QUARTER, the selectivity is zero since none of the groups contain unique column values. Accordingly, another column, MONTH, is combined with the column, QUARTER, and the number of combined columns (e.g., COLUMN_NUM_COUNTER) is incremented (e.g., by 1).

The combination of columns QUARTER and MONTH enable Groups 1-5 to contain distinct values, thereby providing a selectivity of one (e.g., UNIQUE_COUNTER/number of groups=5/5=1). Therefore, the combination of QUARTER and MONTH is identified as a composite pivot key.

Present invention embodiments identify pivot keys among plural potential pivot keys by generating one-to-one maps, discovering transformations, and analyzing transformation hit counts as described above. In the above example, {QUARTER, MONTH} is selected as a pivot key instead of {QUARTER, QUARTER_QUALITY} based on transformation hit count analysis.

Figure 4:
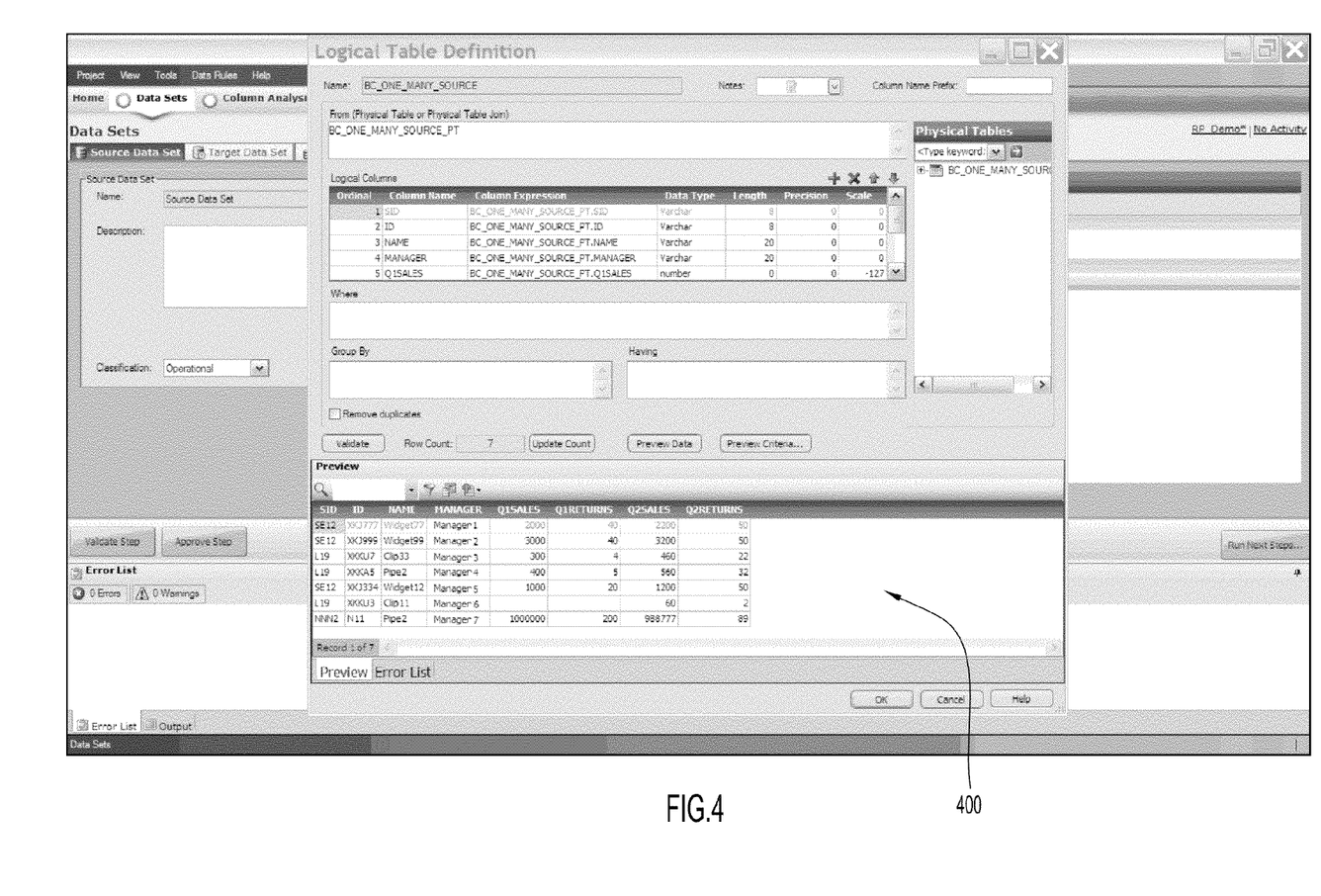
FIG. 4 is schematic illustration of an example graphical user interface screen displaying data from a source database table according to an embodiment of the present invention.
Figure 5:
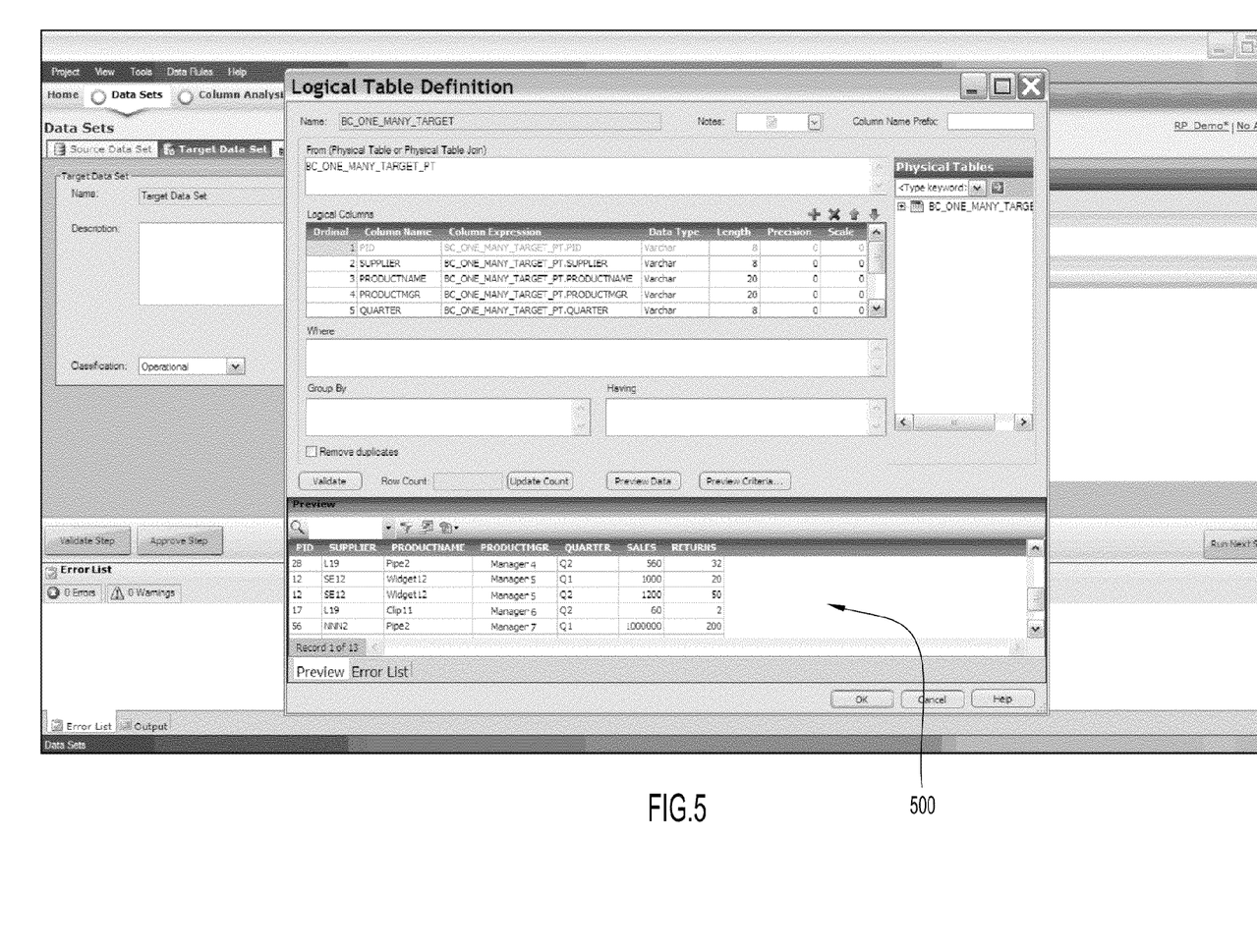
FIG. 5 is schematic illustration of an example graphical user interface screen displaying data from a target database table according to an embodiment of the present invention.
Figure 6:
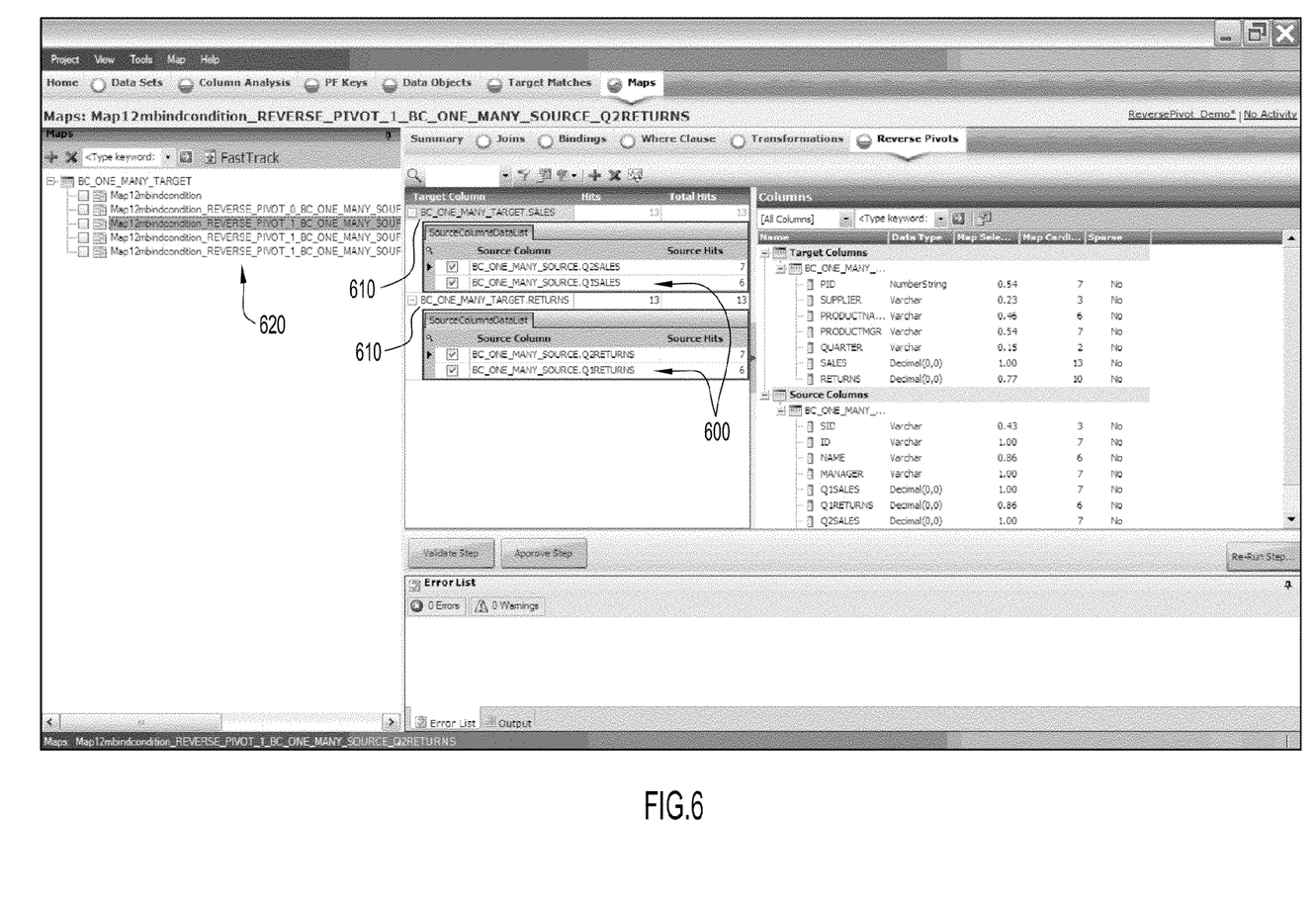
FIG. 6 is schematic illustration of an example graphical user interface screen displaying results of the relationship discovery according to an embodiment of the present invention.

Example graphical user screens are illustrated in FIGS. 4-6. FIG. 4 illustrates an example user interface displaying a source database table 400, while FIG. 5 illustrates an example user interface displaying a target database table 500. FIG. 6 illustrates an example user interface providing reverse pivot columns 600 (e.g., Q1Sales, Q2Sales, Q1Returns, Q2 Returns), pivoted columns 610 (e.g., Sales, Returns), and one-to-one maps 620 with each value corresponding to a pivot key column (e.g., Quarter='Q1', Quarter='Q2').

It will be appreciated that the embodiments described above and illustrated in the drawings represent only a few of the many ways of implementing embodiments for discovering pivot type relationships between database objects.

The environment of the present invention embodiments may include any number of computer or other processing systems (e.g., client systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, relationship module, etc.). These systems may include any types of monitors and input devices (e.g., keyboard, mouse, voice recognition, etc.) to enter and/or view information.

It is to be understood that the software (e.g., relationship module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., relationship module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., metadata, database table data, mappings, binding conditions, correlations, transformations, pivot keys, potential pivot keys, candidate list, etc.). The database system may be implemented by any number of any conventional or other databases, data stores or storage structures (e.g., files, databases, data structures, data or other repositories, etc.) to store information (e.g., metadata, database table data, mappings, binding conditions, correlations, transformations, pivot keys, potential pivot keys, candidate lists, etc.). The database system may be included within or coupled to the server and/or client systems. The database systems and/or storage structures may be remote from or local to the computer or other processing systems, and may store any desired data (e.g., metadata, database table data, mappings, binding conditions, correlations, transformations, pivot keys, potential pivot keys, candidate lists, etc.). Further, the various database tables and structures (e.g., source database table, target database table, etc.) may be implemented by any conventional or other data structures (e.g., files, arrays, lists, stacks, queues, etc.) to store information, and may be stored in any desired storage unit (e.g., database, data or other repositories, etc.).

The database objects may be any suitable data structures (e.g., objects, tables, etc.). The source and target database tables may be of any quantity, include any quantity of rows and columns, and may include any desired data or information. The database tables and corresponding components (e.g., rows, columns, etc.) may be labeled in any fashion.

Present invention embodiments may be utilized to discover any pivoting or shifting of data between tables (e.g., reverse pivot, pivot or other pivots or shifts of data, etc.), and identify any quantity of pivot keys, reverse pivot columns and pivot columns within (or between) one or more source and one or more target database tables.

The pivot keys may include any quantity of any column of a database table. The criteria to determine candidate pivot key columns and potential pivot keys may be based on any quantity of any types of criteria (e.g., selectivity, hit rate, cardinality, etc.). Further, any suitable criteria may be utilized to select a potential pivot key (or pivot key column) from a group of identified pivot keys (or pivot key columns) (e.g., matching or fuzzy matching of data, etc.). The candidate pivot key columns may be filtered based on any quantity of any characteristics suitable for a particular application. The criteria and characteristics may be compared against corresponding thresholds of any desired values (e.g., selectivity threshold or percentages, etc.). The various thresholds and parameters (e.g., selectivity, maximum columns for pivot keys, etc.) may be set to any suitable values (e.g., to control a quantity of pivot key columns, sensitivity to identifying relationships and/or candidates, etc.) and applied in any fashion (e.g., greater/less than, equal, etc.).

The pivot key may be selected from a group of potential pivot keys based on any desired criteria (e.g., hit rates of transformations, etc.). The counters (e.g., for unique groups, hit rates, etc.) may be implemented by software and/or hardware modules, and may be incremented or decremented by any suitable values.

The binding conditions, correlation, and transformations may be discovered manually or automatically via any conventional or other techniques (e.g., automated, user-specified or predetermined, etc.). The binding condition and one-to-one maps may include any suitable expression in any query or other language to associate rows of the source and target database tables. These expressions may include any quantity of any table components and operations and be in any format. The one-to-one maps may include any additional expression with any quantity of unique or other values (e.g., of a column) combined with the initial binding condition (e.g., equalities, inequalities, etc.), or be generated independent of the initial binding condition. The transformations may include any suitable expression in any query or other language to generate target database column data from source database column data. These expressions may include any quantity of any table components and operations and be in any format.

Present invention embodiments may be utilized to determine pivot type relationships between two or more database tables, where one or more initial tables serve as source database tables and one or more remaining database tables serve as target database tables. The generated pivot keys and reverse pivot and pivot columns may include any quantity of columns from the source and/or target database tables.

The present invention embodiments may employ any number of any type of user interface (e.g., Graphical User Interface (GUI), command-line, prompt, etc.) for obtaining or providing information (e.g., generated pivot keys, reverse pivot columns, pivot columns, parameter values, desired database objects, one-to-one maps or other mappings, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., generated pivot keys, parameter values, desired database objects, reverse pivot columns, pivot columns, one-to-one maps or other mappings, etc.).

The present invention embodiments are not limited to the specific tasks or algorithms described above, but may be utilized for determining pivot type relationships between any quantity of any types of database objects.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of determining a relationship between source and target database tables comprising:
    determining one or more potential pivot keys of the target database table, wherein a potential pivot key includes one or more columns of the target database table related to metadata indicating identifiers of a plurality of source database table columns;
    creating maps for each potential pivot key between rows of the source and target database tables based on distinct values of that potential pivot key;
    generating one or more transformations for each map that enable data for the target database table to be produced from the corresponding data in the source database table;
    analyzing the one or more transformations for each potential pivot key and selecting the potential pivot key with the one or more transformations that generate the greatest amount of data matching data in the target database table as the resulting pivot key; and
    determining the source and target database table columns corresponding to the resulting pivot key as being associated by the relationship.

2. The computer-implemented method of claim 1, wherein the relationship includes a reverse pivot relationship.

3. The computer program product of claim 2, wherein the operations comprise:
    discovering a plurality of reverse pivot relationships between the source and the target database tables; and
    selecting a best candidate reverse pivot relationship based on statistics gathered during the creating of the maps.

4. The computer-implemented method of claim 1, further including:
    determining one or more binding conditions that associate rows of the source database table with one or more rows of the target database table; and
    identifying binding conditions providing a one-to-many relationship between rows of the source and target database tables to indicate data for determining the one or more potential pivot keys.

5. The computer-implemented method of claim 4, wherein creating maps includes:
    modifying the binding condition associated with a potential pivot key to include the distinct values; and
    wherein generating one or more transformations for each map includes:
        generating one or more transformations for each map based on the corresponding modified binding condition.

6. The computer-implemented method of claim 1, wherein the one or more columns of the potential pivot keys are determined based on a selectivity of distinct values.

7. The computer-implemented method of claim 1, wherein determining the source and target database table columns includes:
    determining the source and target database table columns associated by the relationship based on columns with the greatest amount of matching data produced by the one or more transformations associated with the resulting pivot key.

8. The computer program product of claim 1, wherein the operations further comprise:
   determining results of the reverse pivot relationship including at least one of pivot key columns of the target database table, pivoted columns of the target database table, reverse pivot columns of the source database table, and plural mappings to re-create target data from the source data.

9. A system for determining a relationship between source and target database tables comprising:
   a computer system including at least one processor configured to:
      determine one or more potential pivot keys of the target database table, wherein a potential pivot key includes one or more columns of the target database table related to metadata indicating identifiers of a plurality of source database table columns;
      create maps for each potential pivot key between rows of the source and target database tables based on distinct values of that potential pivot key;
      generate one or more transformations for each map that enable data for the target database table to be produced from the corresponding data in the source database table;
      analyze the one or more transformations for each potential pivot key and select the potential pivot key with the one or more transformations that generate the greatest amount of data matching data in the target database table as the resulting pivot key; and
      determine the source and target database table columns corresponding to the resulting pivot key as being associated by the relationship.

10. The system of claim 9, wherein the relationship includes a reverse pivot relationship.

11. The system of claim 9, wherein the at least one processor is further configured to:
   determine one or more binding conditions that associate rows of the source database table with one or more rows of the target database table; and
   identify binding conditions providing a one-to-many relationship between rows of the source and target database tables to indicate data for determining the one or more potential pivot keys.

12. The system of claim 11, wherein creating maps includes:
   modifying the binding condition associated with a potential pivot key to include the distinct values; and
   wherein generating one or more transformations for each map includes:
      generating one or more transformations for each map based on the corresponding modified binding condition.

13. The system of claim 9, wherein the one or more columns of the potential pivot keys are determined based on a selectivity of distinct values.

14. The system of claim 9, wherein determining the source and target database table columns includes:
   determining the source and target database table columns associated by the relationship based on columns with the greatest amount of matching data produced by the one or more transformations associated with the resulting pivot key.

15. A computer program product for determining a relationship between source and target database tables comprising:
   a non-transitory computer readable storage medium having computer readable program code embodied therewith, the computer readable program code comprising computer readable program code configured to:
      determine one or more potential pivot keys of the target database table, wherein a potential pivot key includes one or more columns of the target database table related to metadata indicating identifiers of a plurality of source database table columns;
      create maps for each potential pivot key between rows of the source and target database tables based on distinct values of that potential pivot key;
      generate one or more transformations for each map that enable data for the target database table to be produced from the corresponding data in the source database table;
      analyze the one or more transformations for each potential pivot key and select the potential pivot key with the one or more transformations that generate the greatest amount of data matching data in the target database table as the resulting pivot key; and
      determine the source and target database table columns corresponding to the resulting pivot key as being associated by the relationship.

16. The computer program product of claim 15, wherein the relationship includes a reverse pivot relationship.

17. The computer program product of claim 15, wherein the computer readable program code further comprises computer readable program code configured to:
   determine one or more binding conditions that associate rows of the source database table with one or more rows of the target database table; and
   identify binding conditions providing a one-to-many relationship between rows of the source and target database tables to indicate data for determining the one or more potential pivot keys.

18. The computer program product of claim 17, wherein creating maps includes:
   modifying the binding condition associated with a potential pivot key to include the distinct values; and
   wherein generating one or more transformations for each map includes:
      generating one or more transformations for each map based on the corresponding modified binding condition.

19. The computer program product of claim 15, wherein the one or more columns of the potential pivot keys are determined based on a selectivity of distinct values.

20. The computer program product of claim 15, wherein determining the source and target database table columns includes:
   determining the source and target database table columns associated by the relationship based on columns with the greatest amount of matching data produced by the one or more transformations associated with the resulting pivot key.

* * * * *